US00RE41482E

(19) United States
(12) Reissued Patent
Oh

(10) Patent Number: US RE41,482 E
(45) Date of Reissued Patent: Aug. 10, 2010

(54) METHOD FOR CONTROLLING A POWER SAVING MODE OF A VIDEO DISPLAY DEVICE WITH RESPECT TO A PREDETERMINED ONE OF A PLURALITY OF APPLIED SIGNAL SOURCES

(75) Inventor: In-Heung Oh, Seoul (KR)

(73) Assignee: Samsung Electronics Co., Ltd., Suwon-si (KR)

(21) Appl. No.: 11/182,037

(22) Filed: Jul. 15, 2005

Related U.S. Patent Documents

Reissue of:
(64) Patent No.: 6,593,975
Issued: Jul. 15, 2003
Appl. No.: 09/671,349
Filed: Sep. 27, 2000

(30) Foreign Application Priority Data

Dec. 20, 1999 (KR) ..... 59432/1999

(51) Int. Cl.
*H04N 5/63* (2006.01)

(52) U.S. Cl. ..... 348/730; 348/554; 348/705; 348/565; 348/E5.112; 348/E5.127; 345/211; 713/323; 713/324

(58) Field of Classification Search ..... 348/730, 348/552–558, 563, 565, 705; 345/211–213; 713/323, 324
See application file for complete search history.

(56) References Cited

U.S. PATENT DOCUMENTS 5,696,978 A * 12/1997 Nishikawa ..... 713/324

(Continued)

FOREIGN PATENT DOCUMENTS

CN 1156379 A 8/1997
CN 1185079 A 6/1998
JP 10-293629 11/1998
KR 94-5554 8/1994
KR 95-22103 7/1995

OTHER PUBLICATIONS

The Chinese Office Action dated Mar. 15, 2003 and an English translation.
The Chinese Office Action dated Jan. 11, 2005 and an English translation.
Korean Office Action dated Aug. 31, 2007 issued in KR Application No. 2007–10633.

*Primary Examiner*—M. Lee
(74) *Attorney, Agent, or Firm*—Stanzione & Kim, LLP

(57) ABSTRACT

A method for controlling a video display device having multiple signal sources, which comprises the steps of: detecting whether a synchronous signal is input to a microcomputer; detecting a signal source selection state if the synchronous signal is not input; converting a present mode to a power-saving mode if the signal source selection state indicates the computer as the selected signal source; and maintaining the present mode if the signal source selection state indicates a signal source other than the computer to be the selected signal source. Alternatively, the method may comprise the steps of: detecting a signal source selection state; detecting whether a power-saving command is input from a computer in the signal source selection state is the computer; executing a power-saving mode if the power-saving mode is input from the computer; detecting a picture-in-picture (PIP) enable state if the power-saving command is not input from the computer; displaying a video signal input from the computer on a screen if the PIP enable state is not enabled; detecting the PIP selection state if the PIP enable state is enabled; displaying the video signal input from the computer on a main screen and displaying a video signal input from a corresponding signal source, according to the PIP selection state, on a subscreen; and displaying a video signal of a selected signal source on a screen if the signal source selection state is a signal source other than the computer.

26 Claims, 3 Drawing Sheets

U.S. PATENT DOCUMENTS 5,781,250 A * 7/1998 Jun ..... 348/706
5,808,693 A * 9/1998 Yamashita et al. ..... 348/554
5,854,618 A * 12/1998 Kiwiet et al. ..... 715/210
6,115,033 A * 9/2000 Choi ..... 345/211
6,172,715 B1 1/2001 Cho ..... 348/565
6,184,875 B1 * 2/2001 Matsuura ..... 345/211
6,404,423 B1 * 6/2002 Kivela et al. ..... 345/212
6,473,078 B1 * 10/2002 Ikonen et al. ..... 345/211
6,515,716 B1 * 2/2003 Suzuki et al. ..... 348/730

* cited by examiner

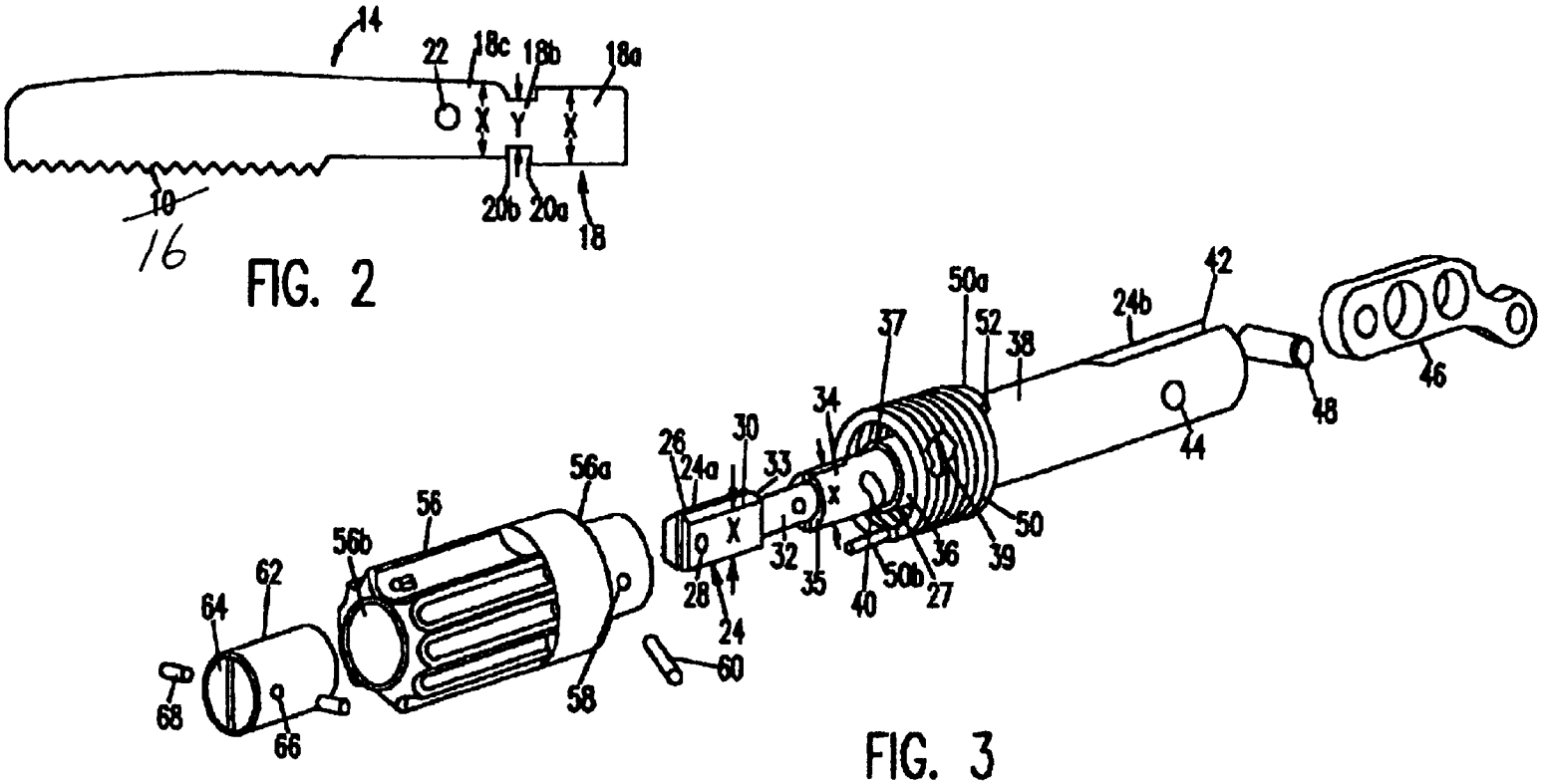
FIG. 2
FIG. 3
AMENDED

METHOD FOR CONTROLLING A POWER SAVING MODE OF A VIDEO DISPLAY DEVICE WITH RESPECT TO A PREDETERMINED ONE OF A PLURALITY OF APPLIED SIGNAL SOURCES

Matter enclosed in heavy brackets [ ] appears in the original patent but forms no part of this reissue specification; matter printed in italics indicates the additions made by reissue.

*CROSS REFERENCE TO PRIOR APPLICATION*

*This application is a Reissue Application of U.S. patent application Ser. No. 09/671,349 filed on Sep. 27, 2000 and issued as U.S. Pat. No. 6,593,975 on Jul. 15, 2003, which is hereby incorporated by reference for all purposes as if fully set forth herein.*

CLAIM OF PRIORITY

This application makes reference to, incorporates the same herein, and claims all benefits accruing under 35 U.S.C §119 from an application Entitled Method For Controlling A Video Display Device Having A Multisignal Source earlier filed in the Korean Industrial Property Office on Dec. 20, 1999, and there duly assigned Serial No. 99-59432 by that Office.

BACKGROUND OF THE INVENTION

1. Field of the Invention

The present invention relates to a method for controlling a video display device having multiple signal sources, and more particularly to a method for controlling a video display device having multiple signal sources capable of determining whether a power saving mode is executed according to a signal source selection state.

2. Description of the Prior Art

In compliance with the current trend of multimedia systems, video display devices such as computer monitors having, for example, a liquid crystal display unit for displaying a received video signal, are appearing on the market and are capable of selectively displaying video signals input from multiple signal sources, such as a computer, a television cable, an antenna, and a video cassette recorder.

A video display device capable of being connected to multiple signal sources may include such components as a tuner, a switching unit, a display controller, a liquid crystal display unit, a key input unit, a microcomputer, a power supply, and a power-saving unit.

In a video display device capable of being connected to multiple signal sources and having the above components, the tuner converts a high frequency television signal input through an antenna or cable into an intermediate frequency and the separates a composite video signal from the intermediate frequency for an output. The switching unit selectively outputs one of the composite video signals of the composite video signal input from the tuner and a composite video signal input from an external signal source (e.g., VCR). The display controller carries out signal processing with respect to a first digital RGB video signal or a second digital RGB video signal to be displayed on a screen. The liquid crystal display unit displays images of the digital RGB video signal input from the display controller.

At this time, the microcomputer controls every unit of a system by a key input of a user, and selectively displays on a screen one of a video signal input from the computer (PC), a video signal input from an television antenna or cable, and a video signal input from the video cassette recorder (VCR).

In general, when a user does not use a turned-on computer, the computer recognizes the lack of use and decreases the power consumption to a level less than a predetermined level such that a signal is not output to the video display device, and when the user again uses the computer, without the computer being turned off, the signal previously displayed will again immediately and automatically appear on the video display device.

A video display device having such a power-saving function is realized with a known display power management system (DPMS) in accordance with a standardized scheme of the Video Electronics Standardization Association (VESA), which is operated with the separation of a normal mode and a power-saving mode. The power-saving mode is divided into a standby mode, a suspend mode, and a turn-off mode and is controlled by computer software. The operations of the normal mode and the power-saving mode of a general video display device are describe as below with reference to Table 1 and FIG. 2.

TABLE 1

| | SAVING/RETURNING COMMAND | | RE- | | TIME |
|---|---|---|---|---|---|
| MODE | horizontal sychronization | vertical sychronization | QUIREMENT STATE | CONSUMPTION POWER | FOR NORMAL STATE |
| normal | yes | yes | forced | 100% | — |
| standby | no | yes | optional | 80% | short |
| suspend | yes | no | forced | 15 W | long |
| off | no | no | forced | 5 W | — |

As indicated by Table 1, the VESA standard calls for the computer (PC) to supply to the video display device a horizontal synchronous signal (H.sync) and a vertical synchronous signal (V.sync) when in the normal mode; only the vertical synchronous signal (V.sync) when in the standby mode, only the horizontal synchronous signal (H.sync) when in the suspend mode, and neither the horizontal synchronous signal (H.sync) nor the vertical synchronous signal (V.sync) to the video display device when in the off mode.

In the normal mode, since the horizontal synchronous signal (H.sync) and the vertical synchronous signal (V.sync) are input from the computer (PC), the microcomputer controls the power-saving unit to normally operate each component of the system by supplying a rated voltage output from a power supply to each component of the system.

In the meantime, in the power-saving mode, since one or more signal of the horizontal synchronous signal (H.sync) and the vertical synchronous signal (V.sync) are not input, the microcomputer controls the power-saving unit according to the power-saving mode to decrease the power consumption to a level lower than a predetermined level by cutting off a voltage supplied to each component of the system from the power supply.

As stated above, the video display device having multiple signal sources is converted to the power-saving mode, if there is no key input from a user for a predetermined time, to cut off the supply of an output voltage from the power supply to each component of the system, so that the power assumption is dropped to a level lower than a predetermined level to meet the VESA standard. Even when a video signal input from a television antenna/cable or a video signal input from a video cassette recorder (VCR) is displayed on a screen, the microcomputer is converted to the power-saving mode to cut off a voltage supplied to each component of the power supply if there is no key input for a predetermined time, so a problem is caused in that the driving of each component of the system is stopped.

SUMMARY OF THE INVENTION

Accordingly, in order to solve the problem, it is an object of the present invention to provide a method for providing a video display device having a multiple signal sources, capable of converting a present mode into a power-saving mode if a computer is selected as a signal source and maintaining the present mode if a signal source other than the computer is selected.

In order to achieve the above object, a method according to the present invention includes the steps of: detecting whether a synchronous signal is input to a microcomputer; detecting a signal source selection state if the synchronous signal is not input; converting a present mode to a power-saving mode if the signal source selection state indicates the computer as the selected signal source; and maintaining the present mode if the signal source selection state indicates a signal source other than the computer to be the selected signal source.

In order to achieve the above object, another method according to the present invention comprises the steps of: detecting a signal selection state; detecting whether a power-saving command is input from a computer in the signal source selection state is the computer; executing a power-saving mode if the power-saving mode is input from the computer; detecting a picture-in-picture (PIP) enable state if the power-saving command is not input from the computer; displaying a video signal input from the computer on a screen if the PIP enable state is not enabled; detecting the PIP selection state if the PIP enable state is enabled; displaying the video signal input from the computer on a main screen and displaying a video signal input from a corresponding signal source, according to the PIP selection state, on a subscreen; and displaying a video signal of a selected signal source on a screen if the signal source selection state is a signal source other than the computer.

Accordingly, when a power-saving command is input from a computer, by converting a present mode to a power-saving mode if the computer is selected as a signal source and maintaining the present mode if a signal source other than the computer is selected, a video display device is prevented from being converted to the power-saving mode by a control of the computer when a video signal input from an external signal source except for the computer is displayed on a screen.

BRIEF DESCRIPTION OF THE DRAWINGS

The above object and other advantages of the present invention will become more apparent by describing in detail a preferred embodiment thereof with reference to the attached drawings, in which:

FIG. 2 is a block diagram for showing a power-saving unit and peripherals of the power-saving unit of the video display device of FIG. 1;

FIG. 3 is a flow chart for showing a method for controlling a video display device having a multiple signal sources according to a first embodiment of the present invention.

DETAILED DESCRIPTION OF THE PREFERRED EMBODIMENTS

Hereinafter, a method for controlling a video display device according to an embodiment of the present invention will be described in detail with reference to the accompanying drawings.

Figure 1:
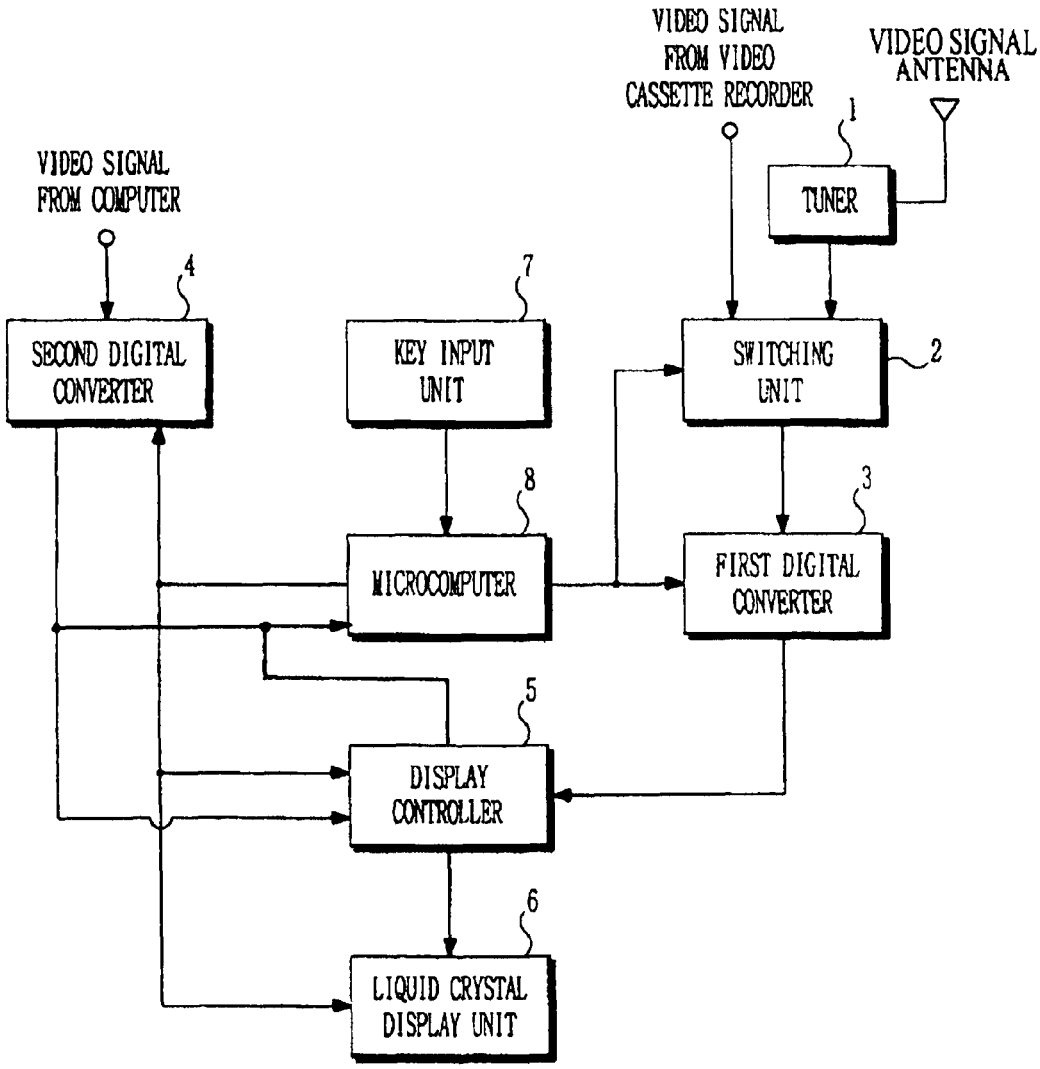
FIG. 1 is a block diagram for showing a video display device having a multiple signal sources.

FIG. 1 is an entire block diagram for showing a general video display device having a multiple signal sources. As shown in FIGS. 1 and 2, a video display device having multiple signal sources is generally constituted with a tuner 1, a switching unit 2, a first digital converter 3, a second digital converter 4, a display controller 5, a liquid crystal display unit 6, a key input unit 7, a microcomputer 8, a power supply 9, and a power-saving unit 10.

In a video display device having a multiple signal sources at constructed above, the tuner 1 converts a high frequency television signal input through an antenna (or cable) into an intermediate frequency and the separates a composite video signal from the intermediate frequency for an output. The switching unit 2 selectively outputs one of the composite video signals of the composite video signal input from the tuner 1 and a composite video signal input from an external signal source such as a video cassette recorder (VCR).

The first digital converter 3 digitally converts a composite video signal input from the switching unit 2 and then outputs a first digital composite video signal. The second digital converter 4 carries out a digital conversion with respect to an RGB video signal and a synchronous signal input from a computer (PC) and then outputs a second digital RGB video signal and a second digital synchronous signal.

The display controller 5 separates a first digital synchronous signal and the first digital RGB composite video signal from the first digital composite video signal input from the first digital converter 3, and carries out a signal processing with respect to the first digital RGB video signal or a second digital RGB video signal to be displayed on a screen. The liquid crystal display unit 6 displays images of the digital RGB video signal input from the display controller 5.

Key input unit 7 is equipped with a number of keys (not shown) such as a signal source selection key, a PIP selection key, and a PIP enable key, and a microcomputer 8 controls various components of the system according to the key selection made by the user using key input unit 7, to selectively display on a screen of liquid crystal display unit 6 a video signal input from the computer (PC), a video signal input from an television antenna (or cable), and a video signal input from the video cassette recorder (VCR). Video signals can be displayed alone or in picture-in-picture form.

The video display device of FIGS. 1 and 2 has a power-saving function known as a display power management system (DPMS) in accordance with the standardization scheme of the Video Electronics Standardization Association (hereinafter, referring to 'VESA'), which is operated with the separation of a normal mode and a power-saving mode. The power-saving mode is divided into a standby mode, a suspend mode, and a turn-off mode and controlled by a computer software.

FIG. 2 is a block diagram for showing a power-saving unit and peripherals of the power-saving unit of a general video display device. In general, the computer (PC) supplies a horizontal synchronous signal (H.sync) and a vertical synchronous signal (V.sync) to the video display device when in the normal mode, only the vertical synchronous signal (V.sync) when in the standby mode, only the horizontal synchronous signal (H.sync) when in the suspend mode, and the computer (PC) does not supply the horizontal synchronous signal (H.sync) and the vertical synchronous signal (V.sync) to the video display device when in the turn-off mode.

First of all, in the normal mode, since the horizontal synchronous signal (H.sync) and the vertical synchronous signal (V.sync) are all input from the computer (PC), the microcomputer 8 controls the power-saving unit 10 to normally operate each component of the system by supplying a rated voltage output from a power supply 9 to each component of the system.

In the meantime, in the power-saving mode, since one or more signal of the horizontal synchronous signal (H.sync) and the vertical synchronous signal (V.sync) are not input, the microcomputer 8 controls the power-saving unit 10 according o the power-saving mode to decrease the power consumption to a level lower than a predetermined level by cutting off a voltage supplied to each component of the system from the power supply 9.

Figure 4:
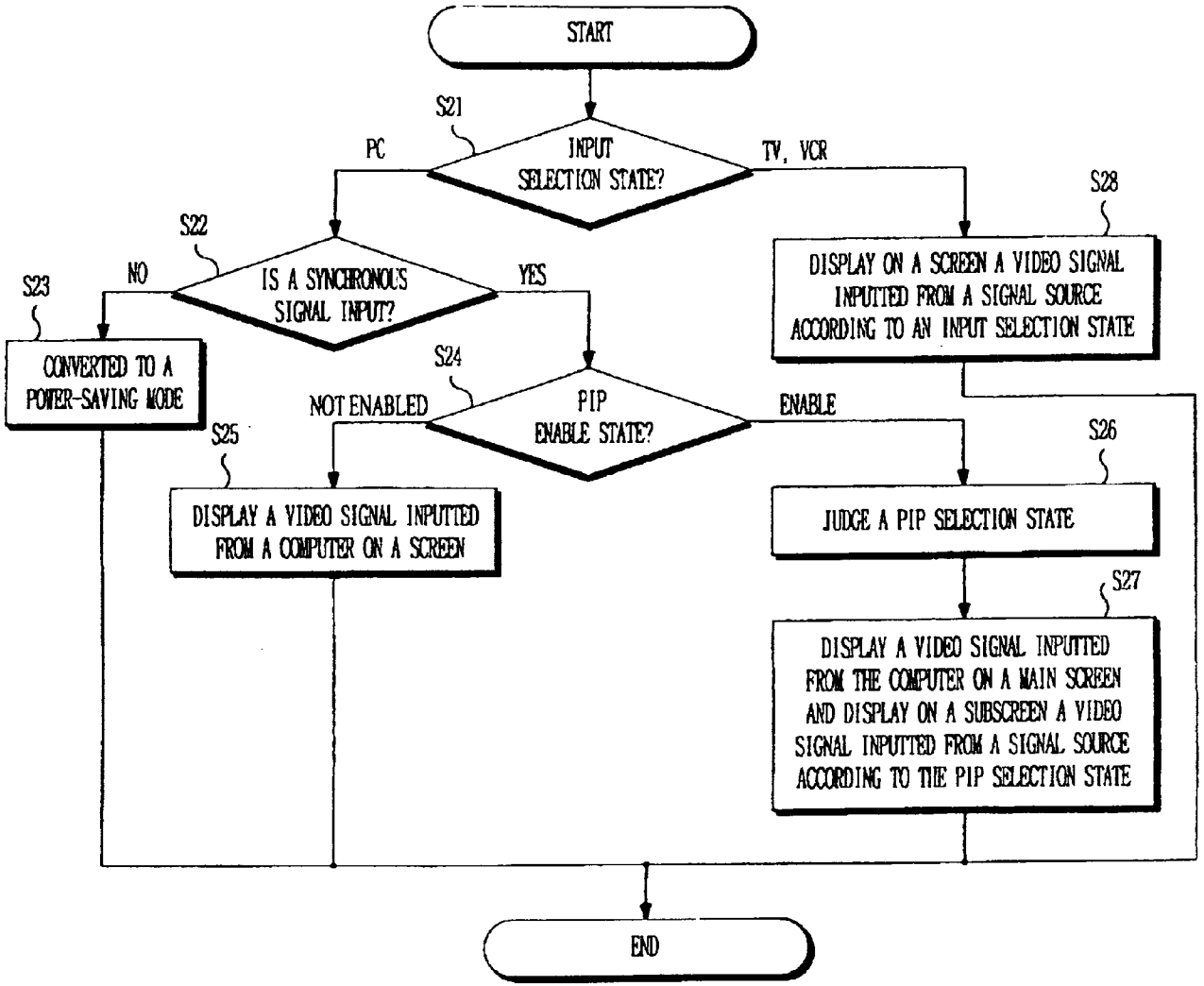
FIG. 4 is a flow chart for showing a method for controlling a video display device having a multiple signal sources according to a second embodiment of the present invention.

FIG. 3 is a flow chart for showing a method for controlling the video display device having multiple signal sources according to a first embodiment of the present invention, and a FIG. 4 is a flow chart for showing a method for controlling a video display device having multiple signal sources according to a second embodiment of the present invention.

As shown in FIG. 3, the method, according to the first embodiment of the present invention, for controlling a video display device having a multiple signal sources, capable of selectively displaying one of a video signal input from a computer, a video signal input from a television antenna (or cable), and a video signal input from a video cassette recorder according to a signal source selection state, includes steps of: detecting whether a synchronous signal is input from the computer (S11); detecting a signal source selection state if the synchronous signal is not input from the computer (S12); converting a present mode to a power-saving mode if it is determined that the computer is the selected signal source according to the detected signal source selection state (S13); and maintaining the present power mode if a signal source other than the computer is the selected source according to the detected signal source selection state (S14).

A method, according to the second embodiment of the present invention as shown in FIG. 4, for controlling a video display device having a multiple signal sources, capable of selectively displaying one of a video signal input from a computer, a video signal input from a television antenna (or cable), and a video signal input from a video cassette recorder according to a signal source selection state or a PIP selection state, includes steps of: detecting a signal source selection state (S21); detecting whether a synchronous signal is input from the computer (S22) if the computer is selected according to the signal source selection state detected in step S21; executing a power-saving mode (S23) if the synchronous signal is not input from the computer according to the result of step S22; detecting a PIP enable state (S24) if the synchronous signal is input from the computer according to the result of step S22; displaying a video signal input from the computer (S25) if the PIP enable state is detected in step S24; judge a PIP selection state (S26) if the PIP enable state is detected in step S24; displaying the video signal from the computer on a main screen, of liquid crystal display, and displaying in a subscreen, of liquid crystal display, a video signal input from a corresponding signal source (S27) according to the judged PIP selection state of step S26; and displaying on a screen a video signal of a signal source selected (S28) if a signal source other than the computer is selected according to the signal source selection state detected in the step S21.

Operations and effects of the first and second embodiments of the present invention as stated above will be described as below.

1. First Embodiment

The video display device having a multiple signal sources as shown in FIGS. 1–2 selectively displays one of a video signal input from the computer, a video signal input from a television antenna, and a video signal input from a video cassette recorder by the microcomputer 8 for controlling each component of the system by a key input of a user.

First of all, the microcomputer 8 determines whether a horizontal synchronous signal (H.sync) and a vertical synchronous signal (V.sync) are input from the computer (S11). According to the result of step S11, if the horizontal synchronous signal (H.sync) and the vertical synchronous signal(V.sync) are not input from the computer, the microcomputer 8 detects a signal source selection state under the assumption that a power-saving command is input (S12).

If it is determined in step S12 that the computer is the selected signal source according to detected the signal source selection state, microcomputer 8 converts a present mode to a power-saving mode (S13). Here, the method for executing a power-saving mode is the sane as the known DPMS method of Table 1, and the description thereof is omitted. If it is determined in step S12 that the computer is not the selected signal source, microcomputer 8 maintains the present power mode (S14). That is, as a result of the determination made in the step S12, if a television antenna or a video cassette recorder is the selected signal source, microcomputer 8 maintains the present power mode (S14).

For example, when the video cassette recorder is selected by the signal source selection state, switching unit 2 selects a composite video signal input from the video cassette recorder to be output to the first digital converter 3. The first digital converter 3 converts the composite video signal as a first digital composite video signal to be output to the display controller 50. The display controller 50 separates a first digital RGB video signal and a first digital synchronous signal from the first digital composite video signal. Display controller 50 carries out a signal processing of the first digital RGB video signal for display on the crystal display unit 60 and provides the first digital synchronous signal (H.sync and V.sync) to microcomputer 8.

2. Second Embodiment

A video display device having a multiple signal sources according to the second embodiment has a PIP function. The PIP (Picture in Picture) function means that, when video signals are input from two signal sources, a video signal input from one signal source is displayed on a video display region (a main screen) and another video signal input from the other signal source is displayed on a portion (a subscreen) of the video display region (the main screen).

The video display device having a multiple signal sources as shown in FIGS. 1–2 selectively displays video signals input from one or more signal sources by controlling each component of the system by microcomputer 8 according to a key input from key input unit 7, and the video signals may include a signal input from the computer, a video signal input from a television antenna (or cable), and a video signal input from the video cassette recorder. Therefore, microcomputer 8 first detects a signal source selection state (S21).

If it is determined in step S21 that the computer is the selected signal source, microcomputer 8 determines whether a horizontal synchronous signal (H.sync) and a vertical synchronous signal are input from the computer (S22). If the horizontal synchronous signal (H.sync) and the vertical synchronous signal (V.sync) are not input, microcomputer 8 executes a power-saving mode under the assumption that the power-saving command is input (S23).

If it is determined in the step S22 that the horizontal synchronous signal (H.sync) and the vertical synchronous signal (V.sync) are input from the computer, microcomputer 8 checks for a PIP enable state under the assumption that the power-saving command is not input (S24). If the PIP disenable state is not detected, microcomputer 8 controls display controller 5 to display the video signal input from the computer on a screen of liquid crystal display 6 (S25).

That is, an RGB video signal and a synchronous signal input from the computer are converted into the second digital RGB video signal and the second digital synchronous signal in the second digital converter (4) to be output to the display controller 50. The display controller 50 properly signal-processes the second digital RGB video signal to be displayed on the liquid crystal display unit 6.

In the meantime, if the PIP enable state is detected in step S24, the microcomputer 8 judges the PIP selection state (S26). That is, microcomputer 8 judges which video signal the user has selected to display in the PIP state. In the embodiment shown in FIG. 4, the microcomputer 8 controls display controller 5 to display the video signal from the computer on a main screen and display the video signal input from first digital converter 4 on a subscreen (S27).

That is, the RGB video signal and the synchronous signal input from the computer are converted into the second digital RGB video signal and the second digital synchronous signal in the second digital converter 4 to be output to the display controller 5. The display controller 5 properly signal-processes the second digital RGB video signal to be displayed on a main screen of the liquid crystal display unit 6. At the same time, if the PIP selection state is the television antenna (TV), the switching unit 2 selects a composite video signal input from the tuner 1 to be output to the first digital converter 3. The first digital converter 3 converts the composite video signal to the first digital composite video signal to be output to the display controller 5. The display controller 5 separates a first digital RGB video signal and the first digital synchronous signal from the first digital composite video signal and properly signal-processes the first digital RGB video signal to be displayed on a subscreen of the liquid crystal display unit 6. However, it should be understood that microcomputer 8 could control display controller 5 to display the video signal from first digital converter 4 on the main screen and display the video signal input from the computer on the subscreen.

In the meantime, if it is determined in the step S21 that the signal source selection state is a signal source other than the computer, the microcomputer 8 controls the display the video signal of the selected signal source on the screen (S28). For example, if the signal source state is the video cassette recorder, the switching unit 2 selects a composite video signal input from the video cassette recorder to be output to the first digital converter 3. The first digital converter 3 converts the composite video signal into the first digital composite signal to be output to the display controller 5. The display controller 50 separates the first digital RGB video signal and the first digital synchronous signal from the first digital composite video signal and properly signal-processes the first digital RGB video signal to be displayed on the liquid crystal display unit 8.

As sated above, in case that a power-saving command is input from a computer, by converting a present mode to a power-saving mode if the computer is selected as a signal source and maintaining the present mode if a signal source other than the computer is selected, it is prevented that a video display device is converted to the power-saving mode by a control of the computer in case that a video signal input from an external signal source except for the computer is displayed on a screen.

What is claimed is:

1. A method for controlling a video display device having multiple signal sources, comprising steps of:

detecting whether a synchronous signal is input to a microcomputer;

detecting a signal source selection state if the synchronous signal is not input;

converting a present mode to a power-saving mode if the signal source selection state indicates a computer is the selected signal source; and maintaining the present mode if the signal source selection state indicates a signal source other than the computer to be the selected signal source.

2. A method for controlling a video display device having multiple signal sources, comprising steps of:

checking a signal source selection state to determine whether a computer or another signal source is selected for providing a video signal to be displayed;

determining whether a synchronous signal is input when the signal source selection state corresponds to selection of the computer;

executing a power-saving mode when it is determined that the synchronous signal is not input;

checking a picture-in-picture enable state when it is determined that the synchronous signal is input;

displaying a video signal input from the computer on a screen if the PIP enable state is not enabled;

judging the PIP selection state if the PIP enable state is enabled;

displaying the video signal input from said computer or said another signal source on a main screen and displaying on a subscreen the video signal not displayed on said main according to the judged PIP selection state; and displaying a video signal of said another signal source on the screen when the signal source selection state corresponds to selection of said another source.

3. The method as set forth in claim 2, wherein said step of displaying a video signal input from the computer on a screen if the PIP enable state is not enabled, comprises steps of:

controlling a display controller to receive a digital video signal and a digital synchronous signal input from a digital converter connected to receive the video signal from said computer such that said display controller outputs the digital video signal to a display unit for display.

4. The method as set forth in claim 2, wherein said step of displaying a video signal of said another signal source on the screen when the signal source selection state corresponds to selection of said another source, comprises steps of:

controlling a display controller to receive a digital video signal from a digital converter connected to a switching unit to receive the video signal from said another signal source such that said display controller separates and a digital synchronous signal input from said digital video signal and outputs the digital video signal to a display unit for display.

5. The method as set forth in claim 2, wherein said step of displaying the video signal input from said computer or said another signal source on a main screen and displaying on a subscreen the video signal not displayed on said main according to the judged PIP selection state, comprises steps of:

determining whether the video signal input from said computer or the video signal input from said another signal source is to be displayed on said main screen;

controlling a display controller to receive a first digital video signal from a first digital converter connected to a switching unit to receive the video signal from said another signal source such that said display controller separates a first digital synchronous signal from said first digital video signal and outputs the digital video signal to a display unit for display on said subscreen, when it is determined that said video signal from said computer is to be displayed on said main screen; and controlling said display controller to receive a second digital video signal and a second digital synchronous signal input from a second digital converter connected to receive the video signal from said computer such that said display controller outputs the second digital video signal to a display unit for display on said main screen.

6. The method as set forth in claim 2, wherein said step of checking a signal source selection state comprises steps of:

detecting an input to a microcomputer from a user selected key of a key input unit to set said signal source selection state to indicate whether one of said computer, a video cassette recorder and a television antenna is selected for providing a video signal to be displayed; and controlling a switching unit to select one of said video cassette recorder and said television antenna as the source of said video signal from said another signal source, when said signal source selection state indicative of said one of said video cassette recorder and said television antenna.

*7. A video display device, comprising:*

*a plurality of video signal inputs for a plurality of video signal sources;*

*a selector to select one of the video signal inputs;*

*a detector to determine whether a computer is selected from among the plurality of video signal sources and a video signal is received from the computer; and*

*a controller to convert the video display device from a normal mode to a power savings mode if the computer is selected from the plurality of video sources and if the video signal is not received from the computer.*

*8. The video display device of claim 7, wherein the video signal inputs comprise a computer video signal input for a computer video source generating a computer video signal, and*

*the controller converts the video display device from the normal power mode to the power savings mode if the selector selects the computer video signal input and the detector determines that the computer video signal input does not receive the computer video signal.*

*9. The video display device of claim 8, wherein the computer video signal input is an RGB video signal input.*

*10. The video display device of claim 8, wherein the computer video source is a computer.*

*11. The video display device of claim 8, wherein the controller maintains the normal power mode if the selected video signal input is not the computer video signal input.*

*12. The video display device of claim 11, wherein the video signal inputs further comprise a composite video signal input.*

*13. The video display device of claim 12, wherein the detector determines whether the selected video signal input receives the video signal if the selector selects one of the video signal inputs.*

*14. The video display device of claim 8, wherein the detector determines that the computer video signal input receives the computer video signal if the computer video signal input receives a synchronizing signal of the computer video signal.*

*15. A method for operating a video display device having a plurality of video signal inputs for a plurality of video sources, the method comprising steps of:*

*selecting one of the video signal inputs from at least one of the plurality of video sources;*

*determining whether a computer is selected from among the plurality of video signal sources and a video signal is received from the computer; and*

*converting from a normal power mode to a power saving mode if the computer is selected from the plurality of video sources and if the video signal is not received from the computer.*

*16. The method of claim 15, wherein the video signal inputs comprises a computer video signal input for a computer video source generating a computer video signal, and*

*the converting step converts from the normal power mode to the power savings mode if the computer video signal input is selected during the selecting step and if it is determined that the computer video signal input does not receive the computer video signal during the determining step.*

*17. The method of claim 15, wherein the computer video signal input is an RGB video signal input.*

*18. The method of claim 17, wherein the computer video source is a computer.*

*19. The method of claim 16, further comprising a step of maintaining the normal power mode if the video signal input selected during the selecting step is not the computer video signal input.*

*20. The method of claim 16, wherein the determination step comprises a step of checking if the computer video signal input receives a synchronizing signal of the computer video signal.*

*21. The method of claim 20, wherein, in the determination step, it is determined that the computer video signal input receives the computer video signal if the computer video signal input receives the synchronizing signal of the computer video signal.*

*22. A method for operating a video display device having a plurality of video signal inputs for a plurality of video signal sources comprising a computer video signal source generating a computer video signal, comprising steps of:*

*determining which video signal source input is selected from the plurality of video signal sources;*

*maintaining a present mode if the computer video signal source input is not selected;*

*determining whether a synchronous signal of the computer video signal is detected if the computer signal source input is selected; and*

*converting the present mode to a power saving mode if the synchronous signal is not detected.*

*23. The method of claim 22, further comprising:*

*determine whether a picture-in-picture (PIP) operation is enabled if the synchronous signal is detected;*

*displaying the computer video signal from the computer video signal input on a main screen if the synchronous signal is detected and the PIP operation is not enabled;*

*displaying one of the computer video signal and another video signal on the main screen and the other on a subscreen if the synchronous signal is detected and the PIP operation is enabled.*

*24. A method for operating a video display device capable of being connected to a plurality of video signal sources comprising a computer video signal source generating a computer video signal, comprising steps of:*

*determining which video signal source is connected to the video display device;*

*maintaining a present mode if it is determined that the computer video signal source is not connected to the video display device; and*

*determining whether the video display device receives the computer video signal from the computer video signal source if it is determined that the computer video signal source is connected to the video display device; and*

*converting to a power save mode if it is determined that the computer video signal source is connected to the video display device and the video display device does not receive the computer video signal from the computer video signal source.*

*25. A video display device having a plurality of video signal inputs comprising a computer video signal input receiving a computer video signal, comprising:*

*an input unit allowing a user to select at least one of the video signal inputs; and*

*a control unit to maintain a present mode if the computer video signal input is not selected, to determine whether a synchronous signal of the computer video signal is detected if the computer video signal input is selected, and to convert the present mode to a power saving mode if the computer video signal input is selected and the synchronous signal is not detected.*

*26. The video display device of claim 25, further comprising:*

*a switching unit selecting one of video signals from the video signal inputs;*

*a first digital converter converting the video signal selected by the switching unit to a first digital video signal;*

*a second digital converter converting the computer video signal from the computer signal input to a second digital video signal; and*

*a display controller processing one of the first digital video signal and the second digital video signal to be displayed on a screen,*

*wherein the control unit determines whether a picture-in-picture (PIP) operation is enabled if the synchronous signal of the computer video signal is detected, and controls the display controller to display the second digital video signal on the screen if the PIP operation is not enabled and to display one of the first digital video signal and the second digital video signal on a main screen and the other on a subscreen if the PIP operation is enabled.*

* * * * *